United States Patent [19]

Hovey et al.

[11] E Patent Number: Re. 32,633

[45] Reissued Date of Patent: Mar. 29, 1988

[54] CURSOR CONTROL DEVICE

[75] Inventors: Dean Hovey, Los Altos; James Sachs, Menlo Park; James Yurchenco, Palo Alto; William Lapson, Cupertino, all of Calif.

[73] Assignee: Apple Computer, Inc., Cupertino, Calif.

[21] Appl. No.: 811,635

[22] Filed: Dec. 20, 1985

Related U.S. Patent Documents

Reissue of:

[64] Patent No.: 4,464,652
Issued: Aug. 7, 1984
Appl. No.: 399,704
Filed: Jul. 19, 1982

U.S. Applications:

[62] Division of Ser. No. 399,704, Jul. 19, 1982, Pat. No. 4,464,652.

[51] Int. Cl.[4] ..... G09G 1/16

[52] U.S. Cl. ..... 340/710; 340/706; 340/709; 178/18

[58] Field of Search ..... 340/706, 711, 712, 709, 340/710, 809, 810, 716, 870.28, 870.29; 178/18, 19; 74/471 XY; 388/183

[56] References Cited

U.S. PATENT DOCUMENTS

| | | | |
|---|---|---|---|
| 3,395,589 | 8/1968 | Gersten | 74/198 |
| 3,541,541 | 11/1970 | Englebart | 340/710 |
| 3,625,083 | 12/1971 | Bosc | 74/471 XY |
| 3,835,464 | 9/1974 | Rider | 340/710 |
| 3,987,685 | 10/1976 | Opocensky | 340/710 |
| 4,245,244 | 1/1981 | Lijewski et al. | 358/183 |
| 4,310,839 | 1/1982 | Schwerdt | 340/709 |
| 4,369,439 | 1/1983 | Broos | 340/710 |
| 4,404,865 | 9/1983 | Kim | 74/471 XY |

FOREIGN PATENT DOCUMENTS

| | | | |
|---|---|---|---|
| 1526428 | 9/1978 | United Kingdom | 340/710 |

*Primary Examiner*—Gerald L. Brigance
*Attorney, Agent, or Firm*—Blakely, Sokoloff, Taylor & Zafman

[57] ABSTRACT

A cursor control device having particular application to a computer display system is disclosed. The cursor control includes a unitary frame, having a domed portion substantially surrounding and retaining a ball which is free to rotate. X-Y position indicating means are provided, such that rotation of the ball provides signals indicative of X-Y positions on the display system. The ball is free to "float" in the vertical direction within the dome, and thereby maintain good surface contact. X-Y positions are established by movement of the control device over a surface. A display system and method is disclosed for use in conjunction with the cursor control device, which permits a user to select command options simply by movement of the displayed cursor over a "pull-down" menu bar.

8 Claims, 15 Drawing Figures

Fig. 3
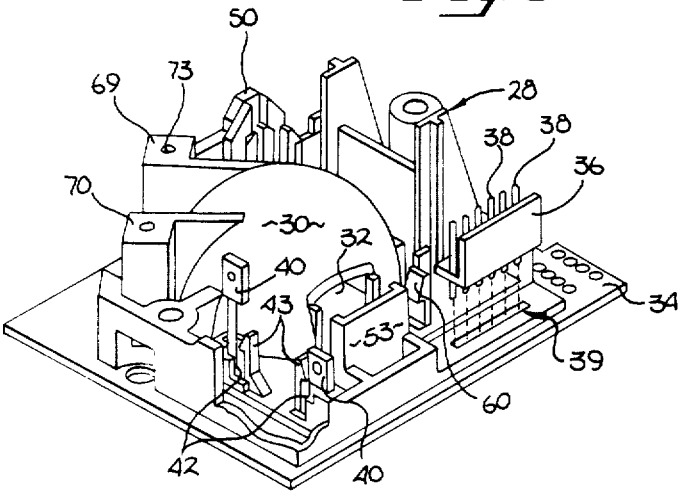
Fig. 4
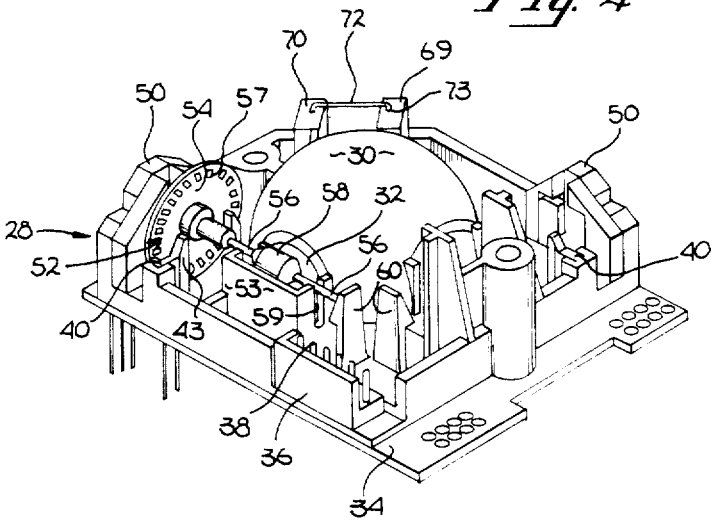
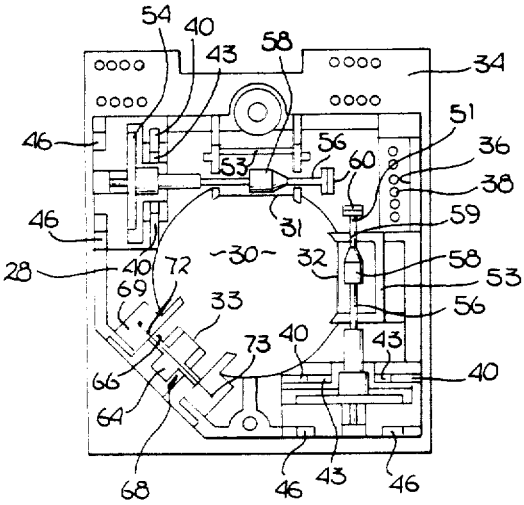
Fig. 5

CURSOR CONTROL DEVICE

Matter enclosed in heavy brackets [ ] appears in the original patent but forms no part of this reissue specification; matter printed in italics indicates the additions made by reissue.

*This application is a divisional reissue of application Ser. No. 06/399704, filed Jul. 19, 1982, now U.S. Pat. No. 4,464,652.*

BACKGROUND OF THE INVENTION

1. Field

The present invention relates to the field of display systems, and more particularly to devices which can position a cursor over selected locations on a computer controlled display.

2. Art Background

In many computer controlled display systems, it is desirable to allow the user to control the position of a cursor or the like by means which are external from the main computer keyboard. For example, a user may be required to repetitively choose software options displayed on a cathode ray tube (CRT), or may desire to input data in a diagram format into the computer system. In such situations traditional keyboard input systems are not as effective as a cursor control device commonly referred to as a "mouse".

In a typical "mouse" system, a hand-held transducer provides positional movement signals to the display system. Traditionally, the movement of wheels within the cursor control device are coupled to potentiometers to provide signals indicative of an X-Y position on the display screen (see U.S. Pat. Nos. 3,541,541; 3,269,190; and 3,835,464). Other mouse systems utilize rotating balls on wheels which are in turn coupled to rotate apertures interrupting beams of light, thereby providing positional signals to the display system (see U.S. Pat. Nos. 3,892,963 and 3,541,521).

One common disadvantage of cursor control devices found in the prior art is their cost. Typically, prior art cursor controls include costly mechanical parts which require precise alignment for proper operation. Moreover, it is not uncommon for these devices to exhibit a loss in accuracy over time as the mechanism wears. As computer display capabilities have become more advanced in terms of user real-time graphic interaction, cursor control devices have become a necessity in many computer systems. Accordingly, there exists a need to provide a cost effective, simple and highly reliable cursor control device for providing signals indicative of X-Y positions on a computer display system.

As will be disclosed below, the present invention provides an improved cursor control device which overcomes the disadvantages of the prior art by utilizing a unitary frame structure for accurate alignment of all elements and simple assembly, as well as photo-optics to provide the required positional signals. In addition, a display system and method is disclosed for use in association with the cursor control device which permits a user to select command options simply by movement of the cursor over a "pull-down" menu bar.

SUMMARY OF THE INVENTION

A cursor control device having particular application to computer display systems is disclosed. The cursor control includes a unitary frame having a domed portion which houses a ball which is free to rotate. Two encoder disc assemblies are provided, which include roller shafts disposed substantially 90 degrees relative to one another and in contact with the ball. Each roller shaft is coupled to an encoder disc having a plurality of slots disposed radially around the disc periphery. These slots interrupt light beams which are provided by photo-emitters and directed at photo-detectors. Each slotted disc interrupts two light beams which are arranged such that when one beam is fully transmitted, the other is partially blocked. Beam interruptions produce signal pulses representing increments of motion, while the order in which the light beams are interrupted indicates the direction of motion, thereby resulting in an X-Y position on a display system. The ball is maintained in contact with the roller shafts by a spring biased idler wheel. The ball is free to "float" in the vertical direction within the dome, and thereby maintain good surface contact. Moreover, the ball may be easily removed for cleaning to insure that any build up of lint or the like does not prevent the ball from rotating smoothly. A switch is provided within the cursor control housing in order to signal the display system that a desired X-Y location on the display screen has been selected. In operation, a user may selectively position a cursor or the like on a display system by simply moving the cursor control device over a surface, such as a desk, until the desired cursor position is shown on the display device. A display system and method is disclosed for use in conjunction with the cursor control device, which permits user to select command options simply by movement of the displayed cursor over a "menu bar".

BRIEF DESCRIPTION OF THE DRAWINGS

FIG. 3 is a perspective view of the unitary frame of the present invention coupled to the printed circuit board base, illustrating the placement of photo-detectors and the coupling connector.

FIG. 4 is a further perspective view of the unitary frame and circuit boad of FIG. 3 illustrating the position of a roller shaft and encoder wheel.

FIG. 5 is a top view of the unitary frame and printed circuit board of the present invention.

DETAILED DESCRIPTION OF THE INVENTION

A cursor control device having particular application for use in conjunction with a computer display system is disclosed. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
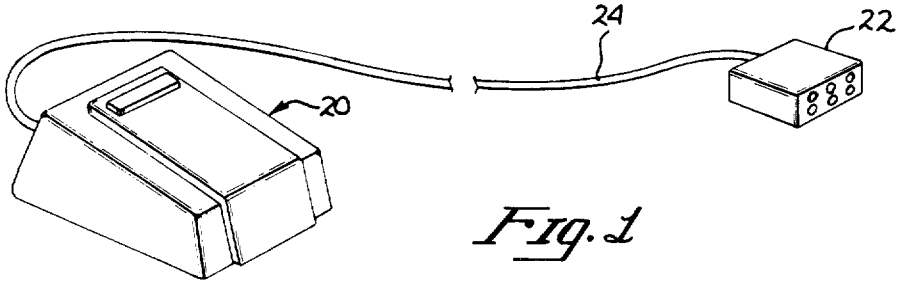
FIG. 1 is a perspective view of the present invention.
Figure 2:
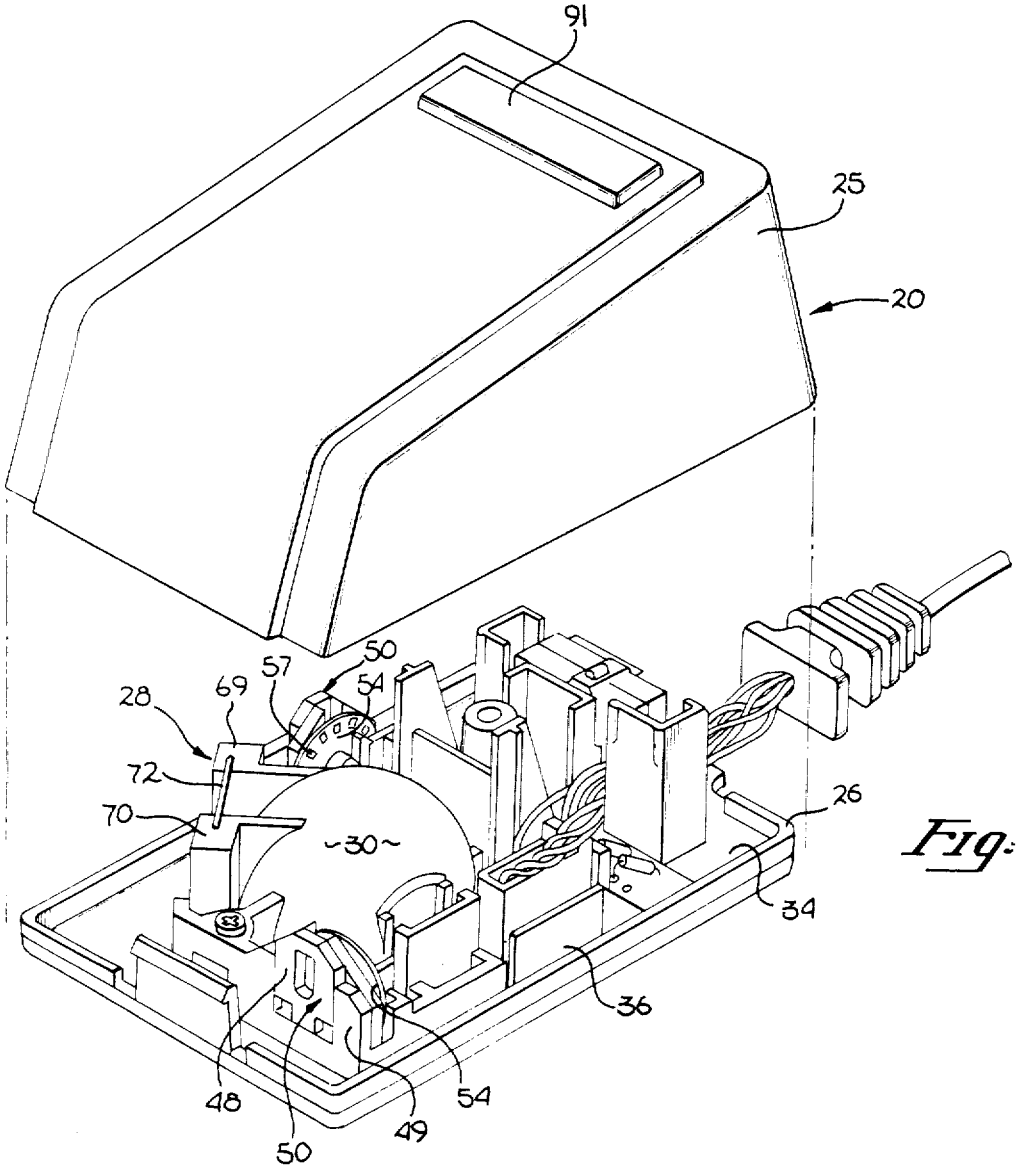
FIG. 2 is a perspective of the present invention illustrating the cursor control device as it appears without the housing cover.

Referring now to FIG. 1, the present invention includes a hand held cursor control unit 20 which is coupled to a plug 22 by means of a cable 24. As best illustrated in FIG. 2, cursor control unit 20 includes a cover 25 and a base 26 upon which the internal workings of the present invention are disposed. As will be apparent from the discussion which follows, cursor control unit 20 is designed with ease of assembly in mind, while providing very close tolerances and high X-Y position location accuracy.

With reference to FIGS. 3, 4 and 5, a premolded unitary frame 28 is provided which includes a domed housing 30 presently having three cut-out locations 31, 32 and 33. As illustrated, cut-outs 31 and 32 are disposed substantially at 90 degrees with respect to one another, with cut-out 33 being oriented generally symmetrically opposite the other cut-outs. In addition, frame 28 includes a plurality of bosses, slots and shaped stems of material which when pertinent will be discussed in this specification. In the presently preferred embodiment, the frame 28 is comprised of a plastic material (e.g. polycarbonate) which is impregnated with a lubricant (e.g. teflon). Thus, during operation and throughout its useful life, cursor control unit 20 does not require the addition of either wet or dry lubricants. Frame 28 is mounted on a printed circuit board 34 to facilitate electrical connection between the various electrical elements within the unit. Electrical connector header 36 is mounted as shown (see FIG. 3) to the unitary frame 28 such that connector pins 38 pass through a rectangular slot 39 through the frame to the circuit board below. As will be discussed, cable 24 is electrically coupled to the cursor control unit 20 through connector 36.

Figure 6:
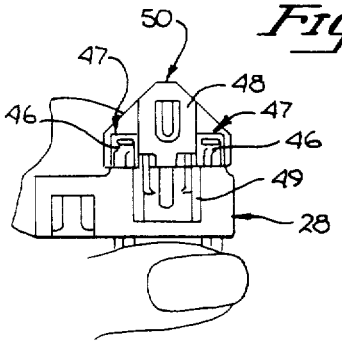
FIG. 6 is a partial view of the unitary frame in FIG. 3, illustrating the insertion of a detector aperture.

As illustrated in FIG. 3, photo-emitters 40 are inserted into slots 42 such that the emitter portion is facing away from the dome 30 (note that one emitter 40 is shown in FIG. 3 partially inserted). Upwardly extending clips 43 are snapped over portions of each emitter 40, as shown, to prevent them from being dislodged. Similarly, two photo-detectors 46 are inserted facing the emitters 40 into slots 47 in each of two detector apertures 50. As shown in FIG. 6, an outwardly extending portion 48 of each detector aperture 50 is aligned with guides 49 formed integrally with the frame 28, and the aperture is then snapped downward into place. Thus, each detector aperture 50 houses two detectors 46 which face two emitters 40, respectively. In the presently preferred embodiment, the emitter/detector combination operates within the infrared region. However, it will be appreciated that any suitable wavelength may be used in a particular application. In addition, presently, the detectors 46 incorporate integral Schmitt triggers to provide detector outputs which more closely approximate a digital signal.

Two encoder disc assemblies are provided to convert, as will be described, the movement of the cursor control unit 20 into signals indicative of X-Y locations defined on the display system. Each encoder assembly 52 includes an encoder disc 54 axially coupled to a roller shaft 56. In addition, each encoder disc 54 is provided with a plurality of radially disposed slots 57 which interrupt the light beams generated by the photo-emitters 40. A cylindrical contact member 58 surrounds each roller shaft 56 at each respective cut out location, as illustrated. Each encoder disc assembly 52 is mounted on the unitary frame 28 by inserting the encoder disc 54 between the detector aperture 50 and emitters 40 and snapping an end clip 60 over the opposite end of the roller shaft 56 (see FIGS. 4, 5 and 7), thereby allowing rotation of the roller shaft and encoder disc with a minimum of friction. As illustrated, each shaft 56 is slipped into and carried by a "U" shaped guide 59 formed from upwardly extending alignment bosses 53 to maintain each roller shaft 56 in proper orientation. End 51 of the shaft 56 is carried for rotation within a hollow portion of the detector aperture 50, such that encoder disk 54 is disposed in close proximity to the aperture 50. The present invention's use of integral lubrication within the frame material, permits each shaft 56 to freely rotate about its longitudinal axis.

As a result of the above described configuration, the radially disposed slots 57 of each encoder disc interrupt two light beams from photo-emitters 40. The position of the emitter/detector combination and encoder disc is such that when one beam is fully transmitted, the other is partially blocked by a slit on the encoder disc. As will be discussed, in operation a ball 62 is disposed within the dome 30 of the frame, and retained such that it is maintained in contact with both cylindrical contact members 58. The rotation of the ball 62 within the dome 30 in turn causes the rotation of each roller shaft 56 and its respective encoder disc. As will be discussed, the beam interruptions from the rotation of each encoder disc 54 produce signal pulses representing increments of motion, while the order in which the light beams are interrupted indicates the direction of motion of the cursor control unit.

Ball 62 is retained against the cylindrical contact members 58 by an idler wheel for rotation on a fixed shaft 66, as best shown in FIG. 5. The idler wheel 64 and shaft 66 are inserted within a slot 68 formed by rectangular bosses 69 and 70 extending upwardly from the frame's base. Wheel 64 extends through cut-out 33 into the interior of the dome 30. The legs of a staple shaped idler spring 72 are inserted through passages 73 passing perpendicular to the horizontal plane of the frame 28 and circuit board 34, thereby retaining the shaft 66 within the slot 68.

Figure 7:
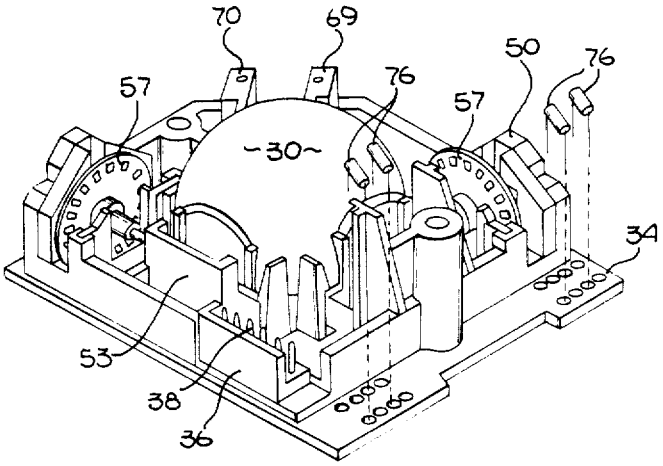
FIG. 7 is a perspective view of the unitary frame of FIG. 3, illustrating the placement of resistors on the printed circuit board.

Referring now to FIG. 7, resistors 76, which are required by the specific electronics of the emitter/detector combination of the present invention, are inserted into the printed circuit board 34. The resistors 76 and associated leads from the connector 36, photo-emitters 40, and photo-detectors 46 are then electrically connected and soldered in place as is conventionally done in the art.

Figure 8:
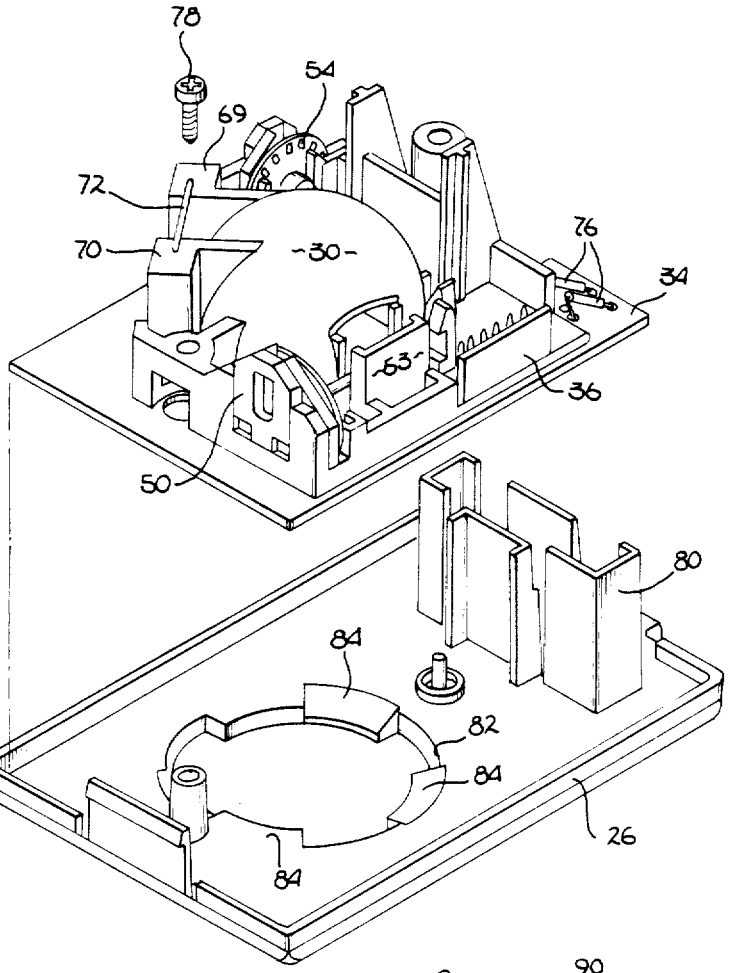
FIG. 8 is a perspective view of the coupling of the unitary frame cage and printed circuit board combination to the housing base of the present invention.
Figure 9:
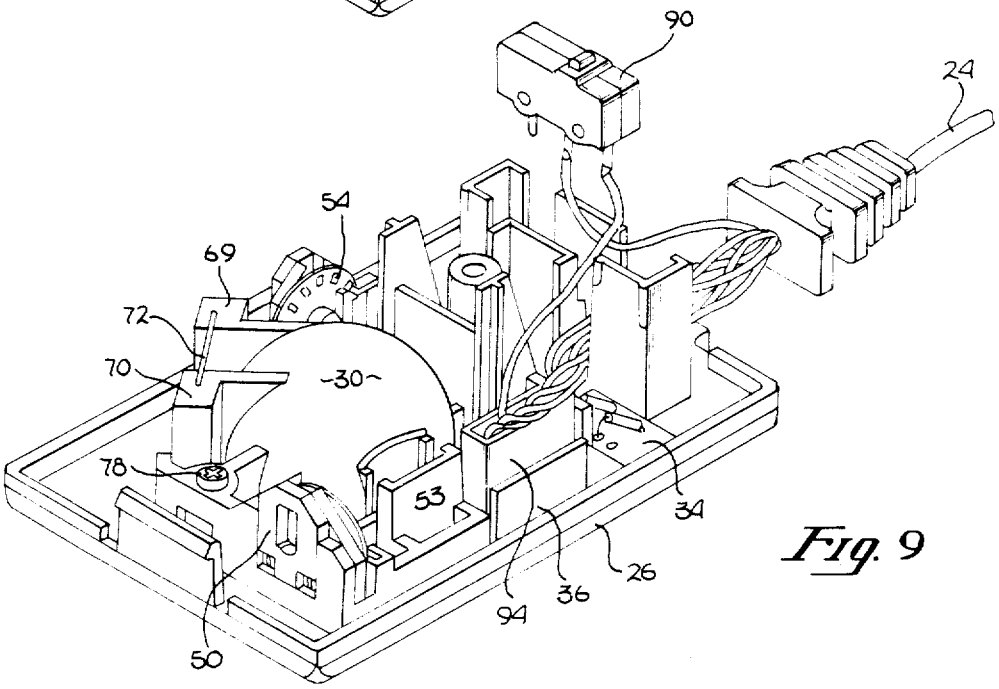
FIG. 9 is a perspective view illustrating the placement of the control switch within the housing base.
Figure 10:
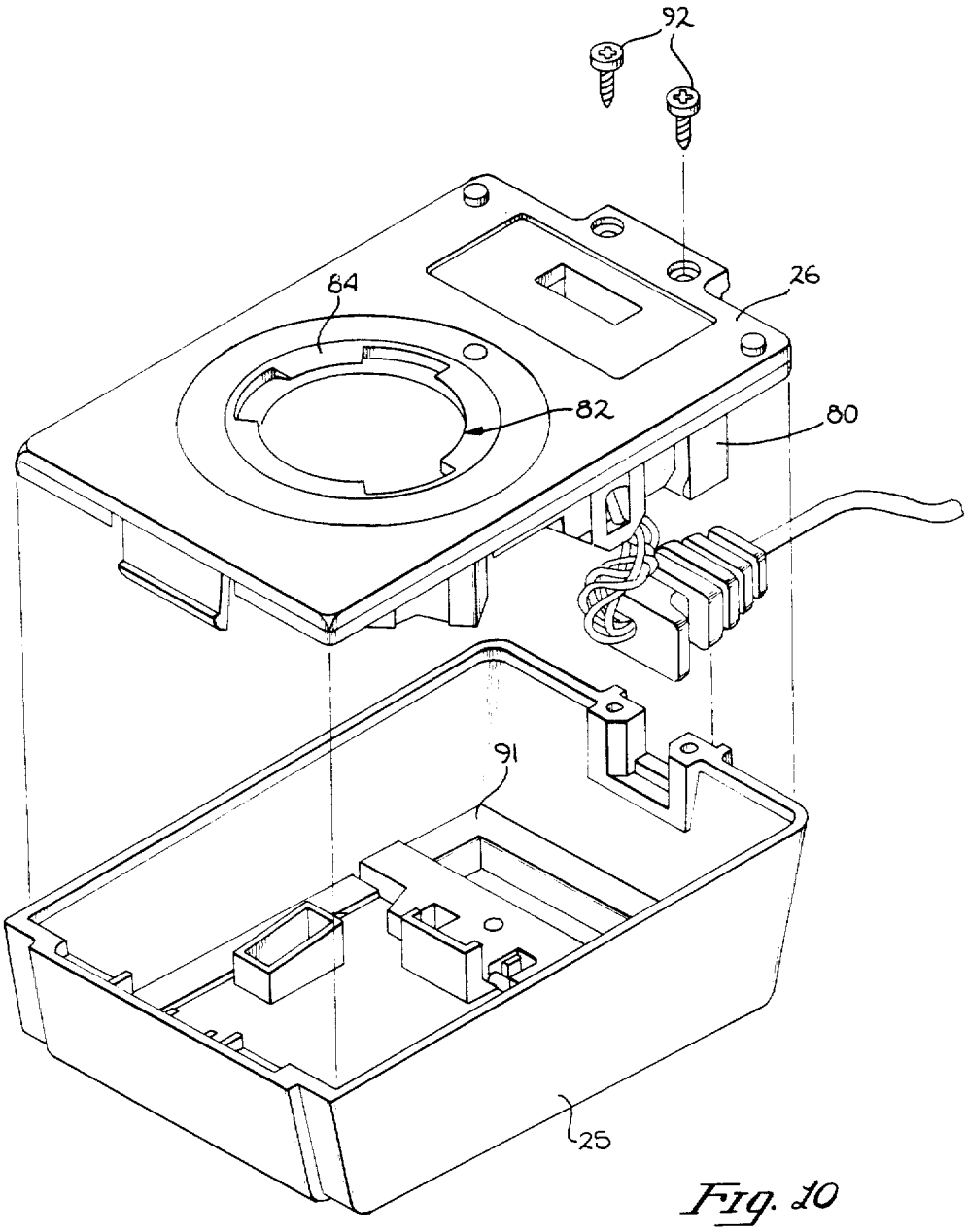
FIG. 10 is the perspective view of the final assembly of the present invention illustrating the coupling of the cover and base portions of the housing.
Figure 11:
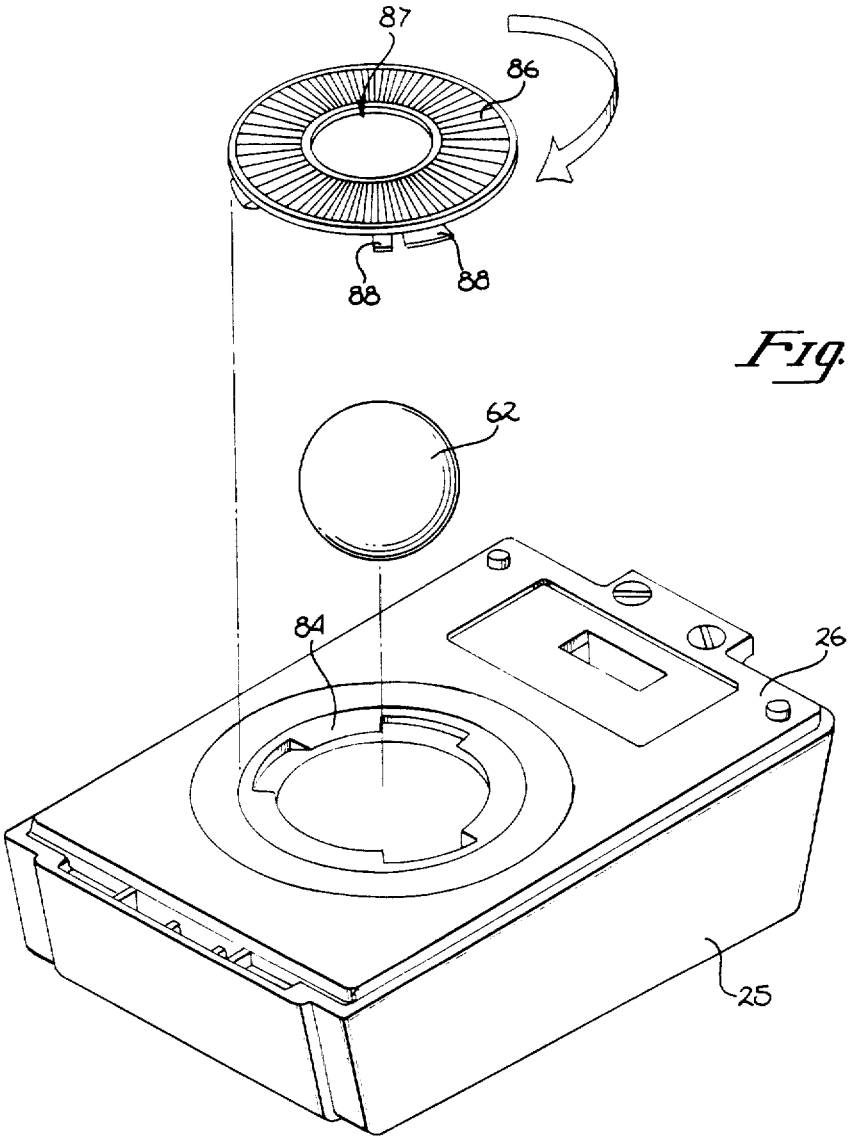
FIG. 11 is a perspective view illustrating the insertion or removal of the floating and rotating ball.

With reference now to FIGS. 8, 9 and 10, the assembled frame 28 and circuit assembly is mounted on the base 26 by means of a screw 78. As illustrated, base 26 includes an upwardly extending switch retaining portion 80 and a generally circular cut-out orifice 82. As best shown in FIGS. 8, 10 and 11, circular orifice 82 is disposed substantially below the opening of dome 30, and includes outwardly extending locking ridges 84 which are designed to accommodate a lock cap 86 (See FIG. 11), such that ball 62 may be retained within the dome 30. Lock cap 86 includes outwardly extending tabs 88 arranged to interleaf with ridges 84. In operation, a user desiring to insert or remove ball 62 from the cursor control unit 20, may unlock and remove the lock cap 86 from the orifice 82 by simply rotating the cap such that the tabs 88 and ridges 84 no longer interleaf.

As illustrated, lock cap 86 generally has a toroidal form having a central orifice 87 of smaller diameter than cutout orifice 82. It will be apparent, that once ball 62 is inserted and retained by lock cap 86, Thus, ball 62 contacts the surface below the cursor control unit 20 and rotates in response to the movement of the unit on the surface.

As shown in FIG. 9, cable 24 is coupled to cursor control 20 through a female connector 94 which is inserted over pins 38. A switch 90 is coupled to the cable 24 through electrical connector 36, and is inserted within the retaining portion 80. A switch cap 91 forms part of the cover 25 (see FIG. 1), and is disposed above switch 90 such that the depression of the switch cap 91 forces switch 90 to electrically close, and thereby signal the computer display system that an appropriate X-Y location has been selected. As shown in FIG. 10, base 26 and cover 25 are coupled by securing both sections to one another using screws 92. Once the cover and base have been joined, ball 62 is inserted and lock cap 86 is attached as discussed above to retain the ball within the dome portion 30.

Figure 12:
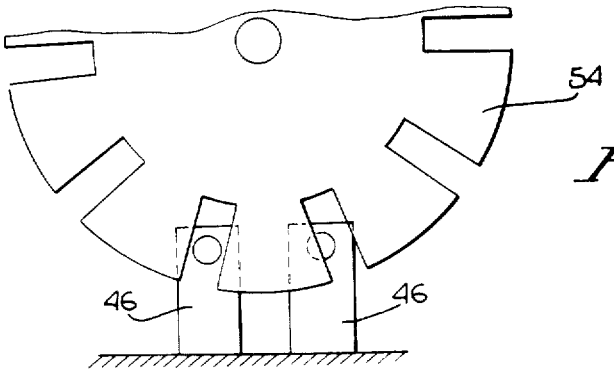
FIG. 12 is a diagrammatical illustration of the alignment of the photo-emitters in relation to each encoder disc.
Figure 13:
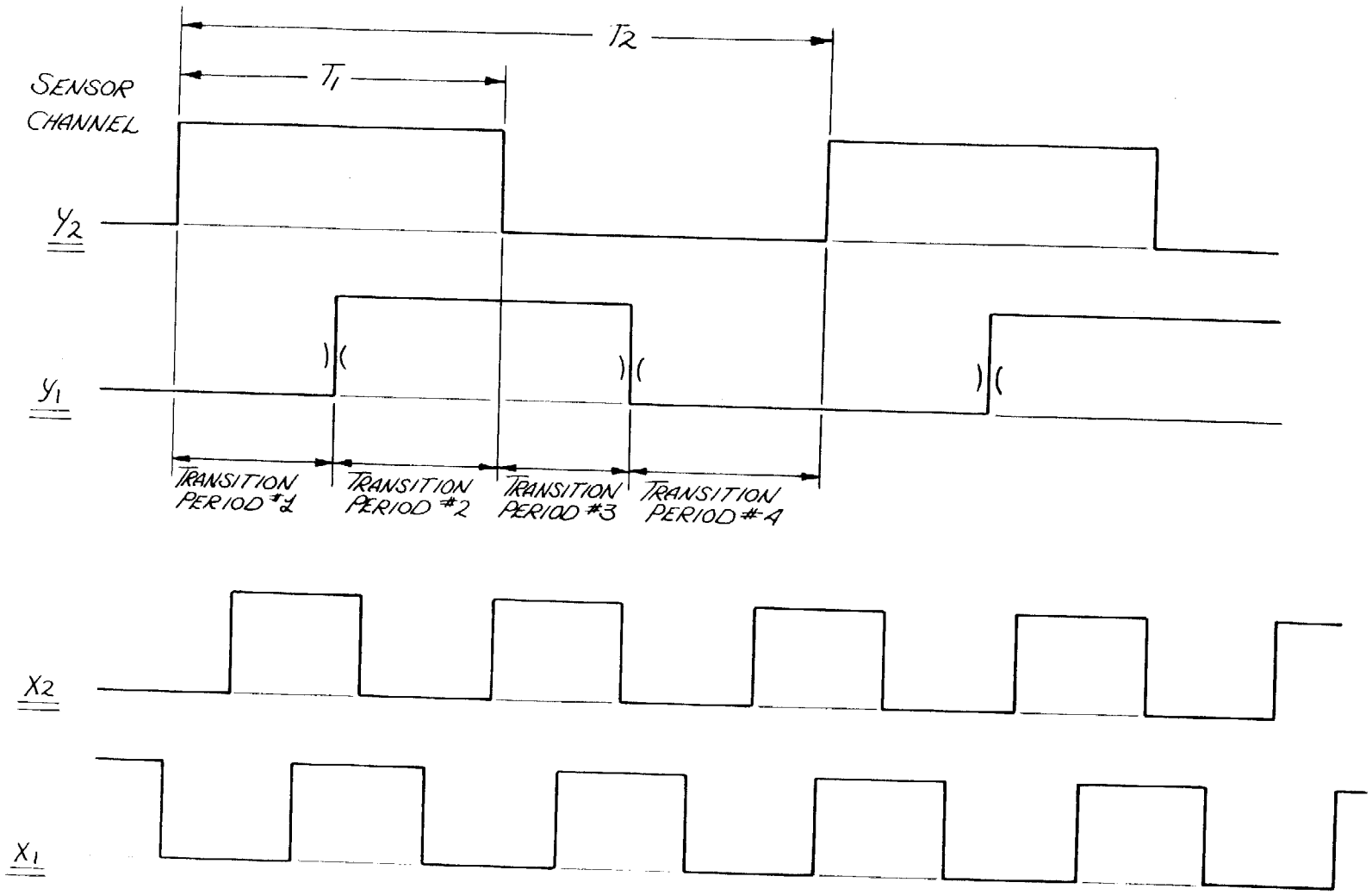
FIG. 13 is a diagrammatical illustration of a sample quadrature output of the present invention indicative of X-Y locations on display system.

With reference to FIGS. 12 and 13, a sample quadrature output of the cursor control unit 20 is illustrated. As previously described, photo-detectors 46 are disposed such that if one detector is fully exposed by a slot of the encoder disc 54, the other detector is only partially exposed. Thus, in addition to the increments of motion of the cursor control over a surface, the direction of motion may also be determined. Assume for sake of example that the cursor control 20 is moved. As illustrated in FIG. 13, a substantially digital output signal is generated by each photo-emitter/detector combination associated with each encoder assembly. In the example shown, cursor control 20 would provide a regularly spaced output from the X channel detectors if the control 20 is moved over a surface at a constant speed along the X-axis. Similarly, if there is little movement of the control unit along the Y axis, little change will occur on the Y channels inasmuch as the Y encoder disk is not being rotated significantly (see FIG. 13). The computer display system is provided with appropriate software or hardware, for example edge detectors, to detect signal state transitions. Thus, the signals from each pair of channels may be decoded such that the X-Y direction of motion may be determined for the particular order of transition changes from each channel along an axis. Inasmuch as the particular circiutry and software used for decoding the various signals and positioning the cursor or the like on a display system will be apparent to one skilled in the art, the details of such will not be recited herein.

Figure 14:
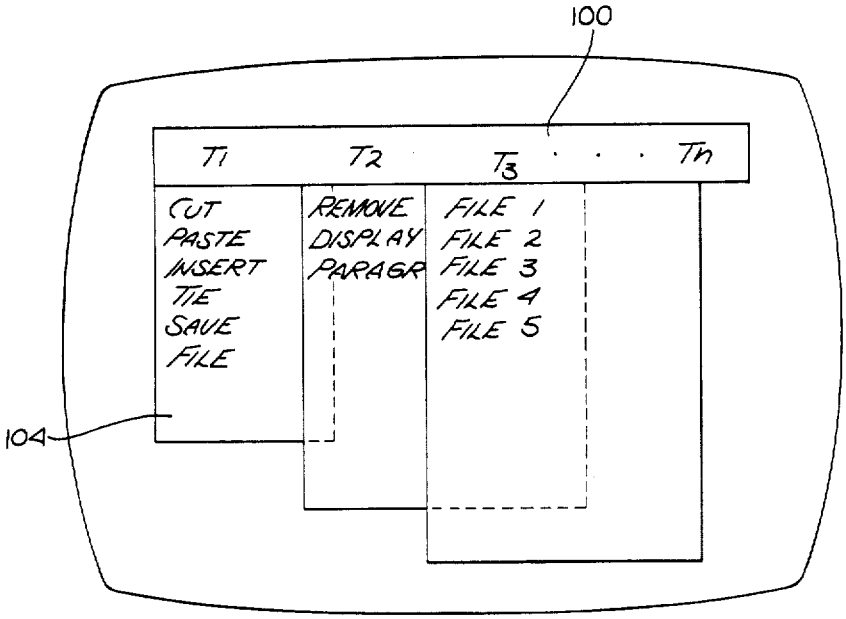
FIG. 14 is a diagrammatical illustration of a "pull down" menu bar display.
Figure 15:
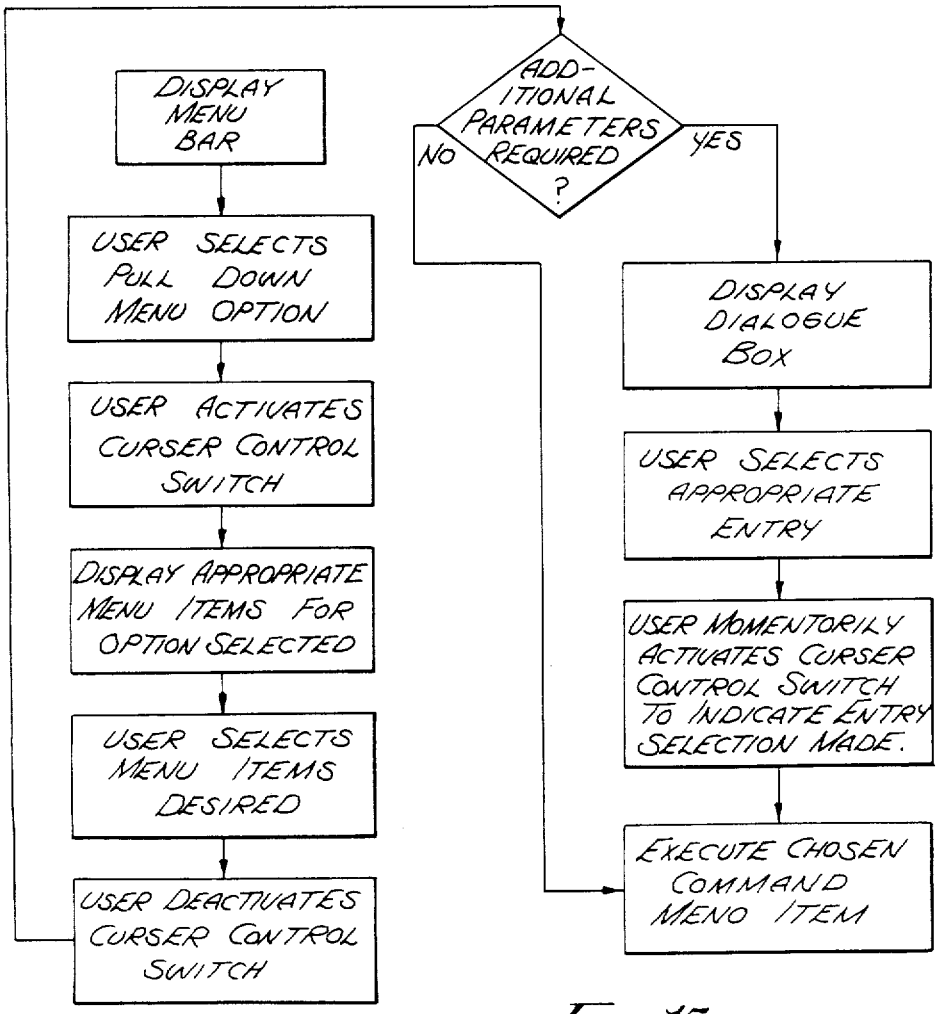
FIG. 15 is a block diagram illustrating the sequence of steps utilized by the present invention to display options and associated commands on a "pull-down" menu bar display.

Referring now to FIGS. 14 and 15, a display system and method for use in conjunction with the cursor control device 20 will be described. As previously discussed, control 20 is coupled to a display system which is controlled by a computer or other equivalent circuitry. Appropriate programming of the computer is provided such that a "menu" bar 100 comprising a variety of command options indicated by titles (for example, $T_1$, $T_2$, $T_3$. . . $T_n$), is displayed across the CRT screen or the like as shown in FIG. 14. If a particular title (for example $T_1$) is selected, one or more sub-command items 104 are displayed by the computer system below the primary menu title. As illustrated, the sub-command items appear to the user to be "pulled down" from the main menu bar 100. The user then selects a desired item for execution by the computer by appropriate movement of a cursor control, as will be described. Although the list of items 104 are shown for illustration below menu title options $T_1$, $T_2$, and $T_3$, in the present embodiment only one menu option may be pulled down and displayed at a time.

The sequence of operations executed by the computer system to permit the user to select a particular menu title and sub-command item is shown in FIG. 15. The computer initially displays menu bar 100 on the display system as shown in FIG. 14. A user desiring to select a particular title moves cursor control unit 20 over a surface, thereby rotating ball 62 within dome 30 and sending signals indicative of X-Y locations to the display system for corresponding movement of a cursor or the like on the display screen. Once the cursor is positioned over (or in proximity with) the chosen menu title selection, the user depresses switch cap 91 on cursor control 20, thereby activating switch 90, and signaling the computer system that the particular title has been selected. The computer display system then either executes the menu title if it is an immediate command, or displays a set of sub-command items for user selection. If items are displayed, the user continues to depress switch cap 91, and once again moves the cursor control over the surface until the displayed cursor lies over or in proximity with the item to be executed. The user then removes pressure from the switch cap 91 thereby deactivating switch 90, and indicating to the computer which item is to be executed.

The computer system then determines if further parameters are required to be specified by the user. If no further data is required, the computer executes the item indicated by the cursor position on the display screen. However, if parameters must be specified by the user prior to execution a "dialogue box" is defined on the display system which displays the various data selections which are required. For example, a user may be required to select page formats, specify numerical values, etc. In the present embodiment, a user inputs the desired data selections by positioning the cursor over the selection, in for example a multiple choice format, and momentarily activates the switch 90 on the cursor control unit. Once the required selections are made, the computer proceeds to execute the chosen menu item.

Accordingly, it is possible for a user to select and execute a variety of commands without the necessity of inputting characters on a keyboard, as is commonly required in the art. Rather, the present invention permits fast entry and execution of commands, such as for example in a word processing system or the like, wherein large blocks of text or other data may be manipulated or operated upon simply by movement of the cursor control 20 over a surface and the appropriate depression of switch 90.

Thus, an improved cursor control and display system has been described. The present invention permits a user to select desired menu titles on a menu bar by movement of a cursor control over a surface. Sub-command items may be specified for execution by the computer control display system in the same manner, such that the operator need not enter command characters on a keyboard or the like in order to access and execute most system functions.

Although the present invention has been described with reference to FIGS. 1-15 and with emphasis on a "pull down" type display system, it should be understood that the figures are for illustration only and should not be taken as limitations upon the invention. It is contemplated that many changes and modifications may be made, by one of ordinary skill in the art, to the materials and arrangements of the elements of the invention without department from the spirit and scope of the invention as disclosed above.

What is claimed is:

1. A device for providing signals indicative of X-Y locations on a display system or the like, comprising:

a housing including a base having an opening for the passage of a rotatable ball;

a unitary frame disposed on saide base including:

a domed portion integrally formed with said frame substantially surrounding and retaining said rotatable ball;

said domed portion having first and second cut-outs through said dome disposed substantially at 90 degrees with respect to one another, and a third cut-out disposed at an angle with respect to said first and second cut-outs;

X-Y position indicating means passing through said first and second cut-outs, for converting the rotation of said ball into signals indicative of X-Y positions on said display system;

biasing means passing through said third cut-out, for biasing said ball against said X-Y position indicating means;

means for removing said ball from said domed portion through said opening in said base, such that said ball and the interior of said dome may be serviced, said means for removing comprising:

outwardly extending lock ridges integrally formed with said opening in said base;

a lock cap having a second opening of smaller diameter then said base opening to permit only a portion of said ball to pass therethrough and contact said surface;

said lock cap further including outwardly extending lock tabs to interleaf with said lock ridges, such that rotation of said cap interleafs with said tabs and ridges thereby locking said cap onto said base;

whereby movement of said device over a surface such that a portion of said ball is maintained in contact with said surface results in X-Y positions defined on said display system.

2. The device as defined by claim 1, wherein said biasing means comprises a wheel carried by a shaft, and shaft being biased such that said wheel is maintained in contact with said ball.

3. The device as defined in claim 2, wherein said third cut-out is disposed generally at 45 degrees with respect to said first and second cut-outs.

4. The device as defined by claim 3, wherein said X-Y position indicating means includes a roller shaft coupled to an encoder disc having a plurality of radially disposed slots, said disc being disposed between a photo-emitter and photo-detector.

5. The device as defined in claim 4, wherein said photo-detector is diposed within a detector aperture, said aperture being retained on said unitary frame to form an integral unit.

6. The device as defined by claim 5, further including a circuit board disposed between said frame and said base.

7. The device as defined by claim 6, further including a switch coupled to said circuit board to specify selected X-Y positions on said display system.

8. The device as defined by claim 7, said device being coupled to a computer controlled display system wherein menu commands are displayed and selected by a user through movement of said device.

[9. A computer controlled display system having a display wherein a plurality of command options are displayed along a menu bar and sub-command items corresponding to each option are displayed once said option has been selected, comprising:

first display means coupled to said computer for generating and displaying said menu bar comprising said plurality of command options;

cursor control means coupled to said display system for selectively positioning a cursor on said display, said cursor control means including a cursor control device for movement over a surface, the movement of said cursor control device over said surface by a user resulting in a corresponding movement of said cursor on said display;

signal generation means including a switch having a first and second position coupled to said display system for signalling said computer of an option choice once said cursor is positioned over a first predetermined area on said display corresponding to an option to be selected, said user placing said switch in said second position while moving said cursor control device over said surface such that said cursor is over said first predetermined area;

second display means coupled to said computer for generating and displaying said sub-command items corresponding to said selected option;

said switch being placed in said first position by said user once said user has positioned said cursor over a second predetermined area corresponding to a sub-command item to be selected;

whereby an option and a sub-command item is selected and executed by said computer.]

[10. The display system of claim 9 wherein said cursor control device comprises:

a housing including a base having an opening for the passage of a rotatable ball;

a unitary frame disposed on said base including:

a domed portion integrally formed with said frame substantially surrounding and retaining said rotatable ball;

said domed portion having first and second cut-outs through said dome disposed substantially at 90 degrees with respect to one another, and a third cut-out disposed at an angle with respect to said first and second cut-outs;

X-Y position indicating means passing through said first and second cut-outs, for converting the rotation of said ball into signals indicative of X-Y positions on said display system;

biasing means passing through said third cut-out, for biasing said ball against said X-Y position indicating means;

means for removing said ball from said domed portion through said opening in said base, such that said ball and the interior of said dome may be serviced, said means for removing said ball comprising:

outwardly extending lock ridges integrally formed with said opening in said base;

a lock cap having a second opening of smaller diameter then said base opening to permit only a portion of said ball to pass therethrough and contact said surface;

said lock cap further including outwardly extending lock tabs to interleaf with said lock ridges, such that rotation of said cap interleafs with said tabs and ridges thereby locking said cap onto said base;

whereby said option and sub-command item may be selected by movement of said cursor control means over a surface such that a portion of said ball is in contact with said surface.]

[11. In a computer controlled display system having a display wherein a plurality of command options are displayed along a menu bar and sub-command items corresponding to each option are displayed once said option has been selected, a method for selecting an option and an item, comprising the steps of:

(a) generating and displaying said menu bar comprising said plurality of command options;

(b) positioning a cursor on said display using a cursor control device for movement over a surface, the movement of said cursor control device over said surface by a user resulting in a corresponding movement of said cursor on said display;

(c) signalling said computer of an option choice once said cursor is positioned over a first predetermined area on said display corresponding to an option to be selected, said user signalling said computer by placing a switch coupled to said display system in a second position while moving said cursor control device over said surface such that said cursor is over said first predetermined area;

(d) generating and displaying said sub-command items corresponding to said selected option;

(e) positioning said cursor over a second predetermined area corresponding to a sub-command item to be selected, said switch being maintained in said second position until said cursor is positioned over said second predetermined area;

(f) placing said switch in a first position once said user has positioned said cursor over said second predetermined area;

whereby an option and an item associated with said option is selected.]

[12. The method as defined by claim 11, wherein said switch is disposed on said cursor control device.]

[13. The method as defined by claim 12, where said computer displays said sub-command items generally below said option on said menu bar.]

* * * * *